Sept. 19, 1933.   M. J. DEUTSCH   1,927,561
AUTOMOBILE JACK
Filed Nov. 13, 1931

INVENTOR:
Michael J. Deutsch
BY David E. Carlsen
ATTORNEY.

Patented Sept. 19, 1933

1,927,561

UNITED STATES PATENT OFFICE 1,927,561

AUTOMOBILE JACK

Michael J. Deutsch, St. Paul, Minn.

Application November 13, 1931
Serial No. 574,688

2 Claims. (Cl. 254—86)

My invention relates to lifting jacks of the type adapted for raising one or more wheels of an automobile and generally known as auto-jacks.

The main object of this invention is to provide simple and highly efficient jack means mounted on a car in proximity to all of its ground wheels and ready to be used with a minimum of effort and little or no inconvenience. The improvement lies mainly in the means used for placing a jack in operative position to raise any one of the four wheels of a car nearest to which it is mounted, the actual raising means involving mechanism not claimed herein to be new in itself.

In the accompanying drawing,—

Figure 1:
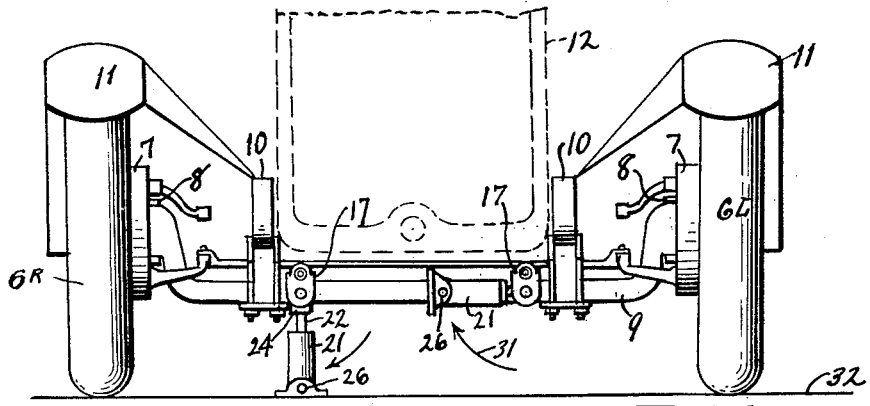
Fig. 1 is a front view of the lower part of an automobile and a pair of my jack devices mounted on its front axle, one of said jacks being lowered for use.

Referring to the drawing by reference numerals, 6R and 6L designate respectively the right and left front wheels of an auto and of which 7 are the brake drums, 8 the spindle bolt, 9 the usually downwardly offset front axle. 10 are the parallel main frame channels, 11 the fenders and 12 the radiator, the last shown dotted only in Fig. 1. 13 is the rear axle housing of which 14 is the differential housing, the rear-right wheel being shown and designated as 15 and having the brake drum 16.

My device comprises a mechanism housing 17 adapted to be bolted as at 18 with a plate 19, to a front axle 9 (see Fig. 4) or by a suitable clamp collar 20 (see Fig. 2) for rigidly mounting it on a rear axle. As shown, my devices are preferably secured to the axles, one near each ground wheel, but it may be in some instances preferable to mount them on the main frame or some other rigid part of the auto which will raise an adjacent wheel when the jack is extended. I have shown a screw-bar or threaded bar type of jack embodying a base and upright part 21 and a threaded bar 22 extending upwardly through its center, the upper end of said bar swiveled at 23 in a head 24. The screw bar is extended upwardly by interior gear means in the base of 21 rotated by the end part 25E, a crank-bar 25 insertible in a socket 26, the crank-bar being preferably of square bar stock and to fit in said socket. 24P is an integral upward extension of head 24 preferably of round shape and toothed as at 24T on about one-third of its perimeter, the said part 24P being rigidly fixed on a horizontal pin 24P' journaled in lower part of housing 17.

Figures 2, 3, 4:
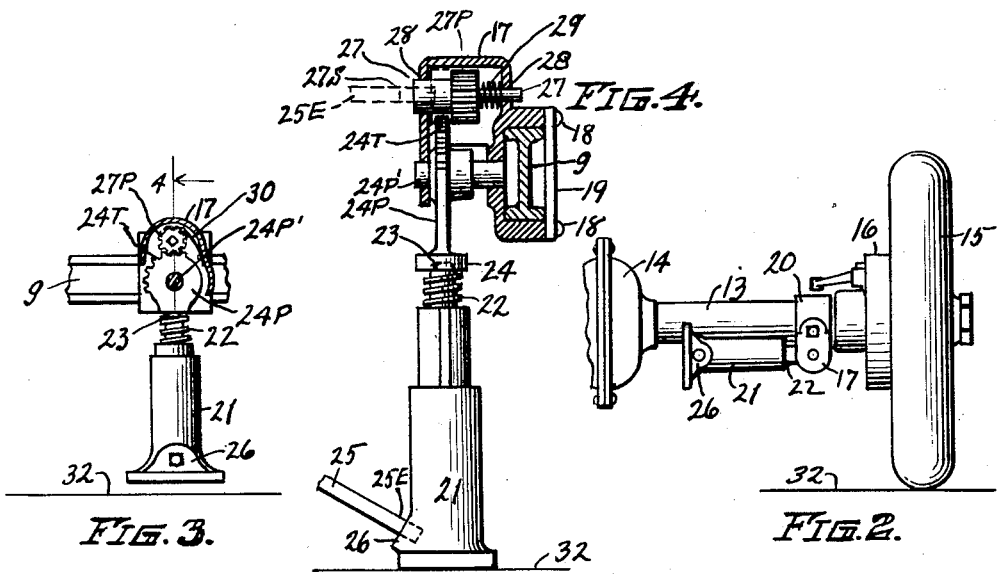
Fig. 2 is a rear elevation of an automobile rear axle showing one ground wheel, the adjacent drive axle housing and one of my jacks in raised position.
Fig. 3 is an enlarged detail front view of a jack, a portion of an axle, and the upper housing of my device in section to reveal a desired type of manipulated mechanism.
Fig. 4 is an enlarged right hand edge view of Fig. 3 showing further details of the mechanism in the upper housing and mounting means of said housing for the usual front axle of an auto.
Figure 5:
Fig. 5 is a side view of the type of adjusting crank-bar used with my devices.

27 is an upper shaft parallel to pin 24P' and carrying a pinion 27P normally in mesh with the teeth 24T of plate 24P, said shaft being slidably journaled at 28 in the upper front and rear walls of housing 17 and the pinion being impelled forwardly to mesh position by a compression coil spring 29 (see Fig. 4). The forward part of shaft 27 is enlarged and has a socket 27S to receive the end of crank-bar 25. 30 in Fig. 3 is a spring-pawl within housing 17 and having a free end normally engaging the teeth of pinion 27P, permitting said pinion to be rotated one way only by the handle-bar 25. It will be readily understood that when the bar end 25E is inserted in socket 27S and pinion 27P rotated thereby the entire jack is forcibly raised from vertical to horizontal position and parallel to the axle, as indicated by arrow 31 in Fig. 1. The jack will be held in any angular position, or horizontal, by the catch 30. To lower a jack, the operator merely inserts end 25E of bar 25 in socket 27S and exerts an inward push, thus disengaging pinion 27P and the teeth 24T of plate 24P being thus disengaged, allow the jack to drop down. Releasing the push on bar 25 spring 29 causes pinion 27P to slide forward and engage the teeth 27T and the jack may be swung upwardly. Obviously, before the jack is raised to horizontal it must be shortened to allow its base to clear the ground or surface 32.

I have now herein described and illustrated in the accompanying drawing, desired means for manipulating the jack from raised to lowered positions or vice-versa. Other equivalent means may be used and other types of jacks may be used, for example, ratchet type jacks in which lever means are used to elongate the jack and raise a wheel. However, that type of jack using a long crank bar 25 as described, is preferred, the same bar 25 being used to swing the jack into or out of operative position.

I claim:

1. A vehicle lifting jack comprising a housing securable to a stationary part of a vehicle in spaced relation to the ground, an expansible and contractible jack member pivotally retained in said housing and comprising a head part, a base and an intermediate threaded part for expanding or contracting the jack, said head part formed with a toothed segment, means in the housing for raising or lowering the entire jack as desired and comprising a pinion slidably journaled in the housing and normally meshing with said toothed segment, the hub of said pinion provided with a socket for engagement by a crank to turn the pinion and raise or lower the jack as set forth.

2. The structure specified in claim 1, and a compression coil spring normally pressing the pinion into meshing position with the toothed segment and adapted to yield under pressure to disengage the pinion, for the purpose set forth.

MICHAEL J. DEUTSCH.